(12) United States Patent
Okada (10) Patent No.: US 7,245,821 B2
(45) Date of Patent: Jul. 17, 2007

(54) IMAGE PROCESSING USING SHARED FRAME MEMORY

(75) Inventor: Shigeyuki Okada, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1049 days.

(21) Appl. No.: 10/156,912

(22) Filed: May 28, 2002

(65) Prior Publication Data

US 2002/0196858 A1 Dec. 26, 2002

(30) Foreign Application Priority Data

May 31, 2001 (JP) .............................. 2001-165943

(51) Int. Cl.
*H04N 5/91* (2006.01)
(52) U.S. Cl. .......................................... 386/68; 386/95
(58) Field of Classification Search ............ 386/68–70, 386/81, 82, 109–112
See application file for complete search history.

(56) References Cited

U.S. PATENT DOCUMENTS

| | | | | |
|---|---|---|---|---|
| 5,377,051 A | * | 12/1994 | Lane et al. ................... | 386/81 |
| 6,012,091 A | * | 1/2000 | Boyce ......................... | 709/219 |
| 6,118,818 A | * | 9/2000 | Min et al. .............. | 375/240.12 |
| 6,542,693 B2 | * | 4/2003 | Boyce ......................... | 386/68 |

FOREIGN PATENT DOCUMENTS

| | | |
|---|---|---|
| JP | H08-111870 A | 4/1996 |
| JP | 07-044428 | 9/1996 |
| JP | 08-166812 | 2/1997 |
| JP | 10-285047 A | 10/1998 |
| JP | 10-003433 | 7/1999 |
| JP | 11-252507 | 9/1999 |
| JP | 11-252507 A | 9/1999 |
| JP | H11-308622 A | 11/1999 |

OTHER PUBLICATIONS

Chinese Office Action dated Jun. 18, 2004.
Office Action (with English translation) issued on Jun. 10, 2005, in Chinese Patent Application No. 02122053.0, filed in May 31, 2002.
Office Action (with English translation) issued on Dec. 24, 2004, in Chinese Patent Application No. 02122065.4, filed May 31, 2002.
Office Action (with English translation) issued on Sep. 17, 2004, in Chinese Patent Application No. 0212054.9, filed May 31, 2002.
Office Action issued on Japanese Patent Application No. 2000-370469, with English translation.

(Continued)

*Primary Examiner*—Thai Q. Tran
*Assistant Examiner*—Mishawn Dunn
(74) *Attorney, Agent, or Firm*—McDermott Will & Emery LLP (57) ABSTRACT

When a reverse reproduction is instructed, an MPEG video stream is once decoded and is again recoded by an MPEG video encoder so as to generate a recoded data sequence which will be overwritten on a storage area in a hard disk. An MPEG video decoder reads out this recoded data sequence in a reverse time-series manner and decodes it successively, and then converts it to a video signal so as to be outputted to a display.

4 Claims, 9 Drawing Sheets

OTHER PUBLICATIONS

Office Action issued on Japanese Patent Application No. 2000-370517, with English translation.
Office Action issued on Japanese Patent Application No. 2000-370562, with English translation.
Office Action issued on Japanese Patent Application No. 2000-370596, with English translation.
Office Action issued on Japanese Patent Application No. 2000-370622, with English translation.

* cited by examiner

IMAGE PROCESSING USING SHARED FRAME MEMORY

BACKGROUND OF THE INVENTION

1. Field of the Invention

The present invention relates to an image processing method, and an image processing apparatus and a television receiver which can utilize the image processing method. The present invention relates to technology in which to process data coded according to, for example, the MPEG (Moving Picture Expert Group) standards.

2. Description of the Related Art

Information handled in the multimedia is of a vast amount and is multifarious, thus a fast processing of the information is necessary in the course of planning to put the multimedia to practical use. In order to process information at high speed, compression and expansion of data become indispensable. The "MPEG" method is one of data compression and expansion techniques. This MPEG method is being standardized by the MPEG Committee (ISO/IEC JTC1/SC29/WG11) under the ISO (International Organization for Standardization)/IEC (International Electro-technical Commission). An image processing apparatus utilizing the MPEG method is built into various image related devices such as movie camera, still camera, television set, video CD reproduction equipment, DVD reproduction equipment and so forth.

Figure 1:
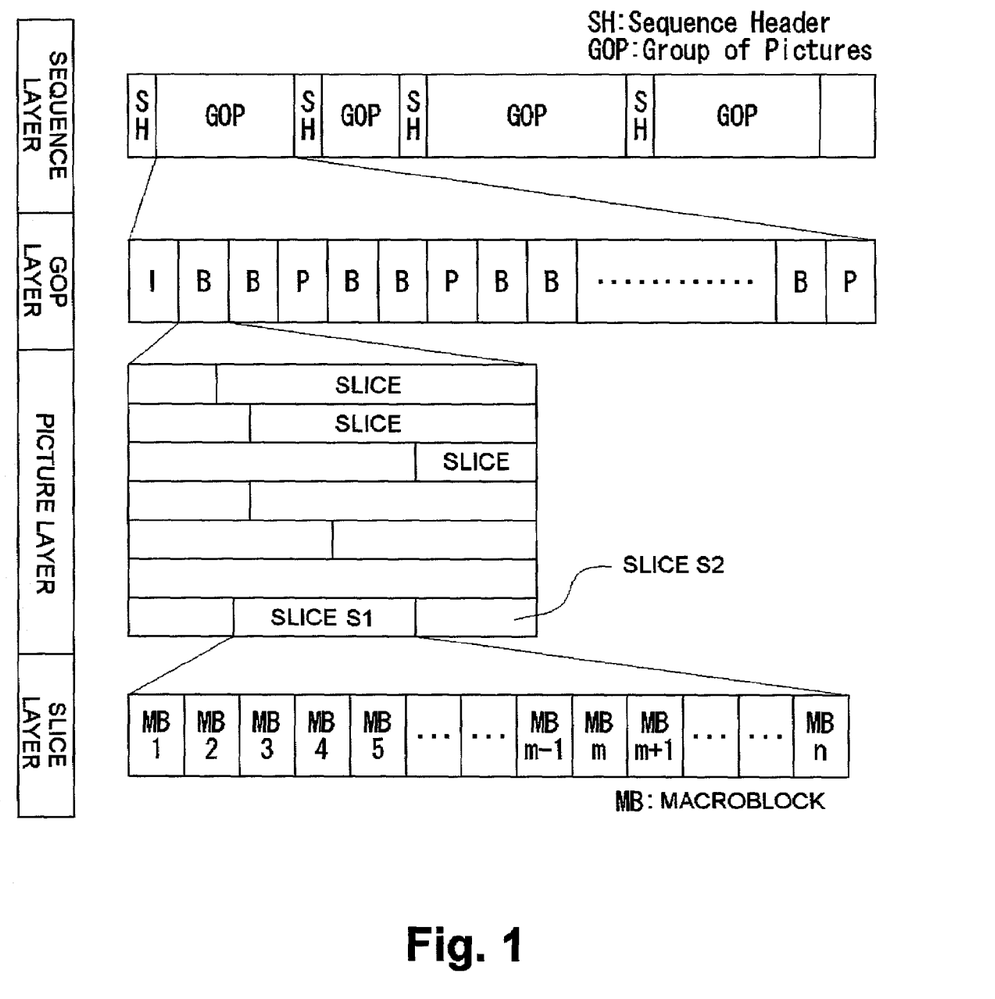
FIG. 1 shows a hierarchical structure of an MPEG video bit stream.

Video data handled in the MPEG relate to moving pictures, and the moving picture is constituted by a plurality of, for example, 30 frames, per second that are still pictures or frames. As shown in FIG. 1, the video data have a hierarchical structure and are comprised of six layers that are a sequence layer, a GOP (group of pictures) layer, a picture layer, a slice layer, a macroblock layer and a block layer in this order. The number of the slices constituting a single picture is not fixed, and the number of the macroblocks constituting a single slice is also not fixed. The macroblock layer and the block layer are omitted in FIG. 1.

Moreover, MPEG is chiefly classified under two methods, namely, MPEG-1 and MPEG-2, according to the coding rates. In MPEG-1, a frame corresponds to a picture. In MPEG-2, however, frames or fields can also be made to correspond to pictures. Two fields constitute one frame. The structure where frames correspond to pictures is called a frame structure, whereas the structure where fields correspond to pictures is called a field structure.

In MPEG, a compression technique called inter-frame prediction is employed. The inter-frame prediction compresses inter-frame data based on a temporal correlation among frames. In the inter-frame prediction, bidirectional prediction is performed. The bidirectional prediction uses both forward prediction for predicting a current reproduced image from a past reproduced image or picture, and backward prediction for predicting a current reproduced image from a future reproduced image.

This bidirectional prediction uses three types of pictures that are I picture (Intra-Picture), P picture (Predictive-Picture) and B picture (Bidirectionally predictive-Picture). An I picture is an image independently produced by an intra-frame coding processing, irrespective of past and future reproduced images. In order for a random access to be performed, at least one I picture is needed within the GOP. All of the macroblock type within the I picture are intra-frame prediction pictures (Intra-Frames). A P picture is produced by the inter-frame coding processing using the forward prediction that is prediction from a past I or P picture. The macroblock type in the P picture includes both an intra-frame prediction picture and a forward prediction picture (Forward Inter Frame).

The B picture is produced by the inter-frame coding processing using the bidirectional prediction. In the bidirectional prediction, a B picture is produced by one of the following three predictions.

(1) Forward Prediction; prediction from a past I picture or P picture.
(2) Backward Prediction; prediction from a future I picture or P picture.
(3) Bidirectional Prediction; prediction from past and future I picture or P picture.

The macroblock type in the B picture includes four types of pictures that are an intra-frame prediction picture, a forward prediction picture, a backward prediction picture (Backward Inter Frame), and an interpolative prediction picture (Interpolative Inter Frame).

These I, P and B pictures are respectively coded. Namely, the I picture can be generated even when no past or future picture is available. In contrast thereto, the P picture can not be generated without the past picture, and the B picture can not be generated without the past or future pictures. However, when the macroblock type is the interpolative prediction picture for the P and B picture, the macroblock is produced even without the past or future pictures.

In the inter-frame prediction, an I picture is periodically produced first. Then, a frame several frames ahead of the I picture is produced as a P picture. This P picture is produced by prediction in one direction from the past to the present, namely, in the forward direction. Thereafter, a frame located before the I picture and after the P picture is produced as a B picture. When producing this B picture, the optimal prediction method is selected from among the three prediction methods which are the forward prediction, backward prediction and bidirectional prediction. In general, a current image and its preceding and succeeding images in consecutive motion pictures are similar to one another, and they differ only partially. Thus, it is assumed that the previous frame and the next frame are substantially the same. If there is a difference between the two frames, that difference only is extracted and compressed. For example, if the previous frame is an I picture and the next frame is a P picture, the difference is extracted as B picture data. Thereby, the inter-frame data can be compressed based on the temporal correlation among frames. A data sequence or a bit stream of video data coded in compliance with the MPEG video part is called an MPEG video stream.

MPEG-1 is designed mainly for storage media such as video CD (Compact Disc) or CD-ROM (CD Read Only Memory). MPEG-2, on the other hand, is designed not only for storage media such as video CD, CD-ROM, DVD (Digital Video Disk) and VTR (Video Tape Recorder) but also for transmission media in general including communication media such as LAN (Local Area Network) and broadcast media such as the ground wave broadcast, satellite broadcast and CATV (Community Antenna Television).

A core of technology used in the MPEG video part lies in a motion compensated prediction (MC) and a discrete cosine transform (DCT). The coding technique combining MC and DCT is called the hybrid coding technique. The DCT (also referred to as a FDCT (forward DCT)) is utilized in the MPEG video part at the time of the coding, so that video signals of the images are decomposed into frequency components so as to be processed. Thereafter, at the time of a decoding, the frequency components are again restored to video signals by using an inverse discrete cosine transform (inverse DCT or IDCT).

The MPEG can process a vast amount of information at high speed and the MPEG uses the compression technique called the inter-frame prediction as described above. Thus, it is extremely difficult to reverse-reproduce a data sequence, for the purpose of a picture search, which is coded and recorded in a time-series manner according to the MPEG, namely, it is extremely difficult to reproduce a recorded data series by simply going back along the time axis in the case of reproduction in the reverse direction as in the usual video tape recorder. Thus, it is conventionally performed that I picture alone allotted in each GOP is reproduced by going back along the time axis. Since the I picture is an image produced by the intra-frame coding processing as described above, it can be independently displayed without referring to pictures before and/or after it.

In the conventional examples, the number of the I picture allotted for each GOP is very small. For example, the number of the I picture allotted for each GOP is at most one among pictures constituting the GOP, and when the picture of per 15 to 30 frames is reverse reproduced, a smooth reverse-reproduced picture as in the usual video tape recorder is not obtained, so that it is difficult to stop at a desired scene at a proper timing.

SUMMARY OF THE INVENTION

The present invention has been made in view of foregoing circumstances, and an object thereof is to provide an image processing technique capable of obtaining smooth reverse-reproduced pictures. In order to achieve this object and other objects which will become clear in this patent specification, the present invention intends to solve problems in the technique relating principally to the coding and decoding processing of images.

A preferred embodiment according to the present invention relates to an image processing apparatus. This apparatus comprises: a front-end decoder which generates a first reproduced image data sequence by decoding a first coded data sequence including I picture, P picture and B picture coded in compliance with MPEG; a first frame memory, utilized for a decoding processing by this front-end decoder, which stores the first reproduced image data sequence; an encoder which generates a second coded data sequence by recoding the first reproduced image data sequence read out from this first frame memory; a back-end decoder which generates a second reproduced image data sequence by decoding this second coded data sequence; and a second frame memory, utilized for a decoding processing by this back-end decoder, which stores at least one picture included in the second reproduced image data sequence, The first frame memory includes: a first region which stores at least one I picture or one P picture to be front referred to for decoding P pictures or B pictures; a second region which stores at least one I picture or one P picture to be back referred to for decoding B pictures; and a third region, utilized for a decoding processing by the front-end decoder, which stores at least one B picture. In other words, a frame memory, according to this preferred embodiment, constituted by both the first memory frame and the second memory can be of a capacity for at least four frames. Therefore, it suffices that the first frame memory and the second frame memory is of a capacity for four frames in total.

Another preferred embodiment according to the present invention relates also to an image processing apparatus. This apparatus comprises: a front-end decoder which generates a first reproduced image data sequence by decoding a first coded data sequence including I picture, P picture and B picture coded in compliance with MPEG; a frame memory, utilized for a decoding processing by this front-end decoder, which stores the first reproduced image data sequence; an encoder which generates a second coded data sequence by recoding the first reproduced image data sequence read out from this frame memory; and a back-end decoder which generates a second reproduced image data sequence by decoding this second coded data sequence.

The frame memory includes: a first region which stores at least one I picture or one P picture to be front referred to for decoding P pictures or B pictures; a second region which stores at least one I picture or one P picture to be back referred to for decoding B pictures; and a third region, utilized for a decoding processing by the front-end decoder, which stores at least one B picture. The third region is an area utilized for a decoding processing by the back-end decoder, and also serves as an area which stores pictures decoded by the back-end decoder. The frame memory according to this preferred embodiment can be of a capacity for at least three frames.

Still another preferred embodiment according to the present invention relates also to an image processing apparatus. This apparatus comprises: a front-end decoder which generates a first reproduced image data sequence by decoding a first coded data sequence including I picture, P picture and B picture coded in compliance with MPEG; a frame memory, utilized for a decoding processing by this front-end decoder, which stores the first reproduced image data sequence; an encoder which generates a second coded data sequence by recoding the first reproduced image data sequence read out from this front-end decoder; and a back-end decoder which generates a second reproduced image data sequence by decoding this second coded data sequence, The frame memory includes: a first region which stores at least one I picture or one P picture to be front referred to for decoding P pictures or B pictures; a second region which stores at least one I picture or one P picture to be back referred to for decoding B pictures; and a third region, utilized for a decoding processing by the front-end decoder, which stores at least one picture. The third region is an area utilized for a decoding processing by the back-end decoder, and also serves as an area which stores pictures decoded by the back-end decoder. The frame memory according to this preferred embodiment can be of a capacity for at least three frames.

Still another preferred embodiment according to the present invention relates also to an image processing apparatus. This apparatus comprises: a plurality of decoders which decode a coded data sequence respectively for different purposes; a frame memory which stores reproduced image data sequences generated by these decoders; and a display circuit which converts the reproduced image data sequences to video signals.

Moreover, the frame memory may be structured such that, when at least part of data of the reproduced image data sequence generated by any one of these decoders is outputted to the display circuit, a part of region included in the frame memory is shared by a plurality of the decoders, by overwriting the outputted data by a reproduced image data sequence generated by other decoder. A plurality of the decoders may include a first decoder which decodes a coded data sequence read out in a time-series manner, and a second decoder which decodes a coded data sequence read out in an inverse time-series manner, and a first reproduced image data sequence generated by the first decoder may be overwritten by a second reproduced image data sequence generated by the second decoder, without waiting for the first reproduced image data sequence to be converted to video signals by said display circuit.

Still another preferred embodiment according to the present invention relates also to an image processing apparatus. This apparatus comprises: a front-end decoder which generates a first reproduced image data sequence by decoding a first coded data sequence; an encoder which generates a second coded data sequence by recoding this first reproduced image data sequence; a storage area which stores this second coded data sequence; and a back-end decoder which generates a second reproduced image data sequence by decoding this second coded data sequence. This back-end decoder realizes reverse reproduction by decoding the second coded data sequence read out from the storage area in a reverse time-series sequence.

Moreover, there may be provided a television receiver equipped with any one of the above-described image processing apparatuses, whereby reproduction of an image in a reverse time-series manner is included as part of operational specifications.

It is to be noted here that the terms "I picture", "B picture" and "P picture" used in the patent specification correspond to and encompass the concept of "I-VOP (Video Object Plane)", "B-VOP" and "P-VOP", respectively, in MPEG-4.

In any case of the above described, the coding or the decoding, and a processing accompanied by these as the case may be, may be performed in a predetermined unit of group. Moreover, different combinations of the above-described arbitrary structural components and processing processes and so forth, as well as expressions, used in the present invention, transferred between a method, an apparatus, a system, a computer program, a recording medium and so forth are still effective as and encompassed by embodiments of the present invention.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combination thereof described in the embodiment are not necessarily essential to the invention.

The processings common to some of the embodiments are forward image reproduction and reverse image reproduction. For the convenience of description, "forward" and "reverse" and their synonyms in the following description should be understood to apply to the order when pictures comprising an image are finally put in a form for display. Hence, unless otherwise indicated, the order of pictures represents the state of display.

As will be described later, even in reverse reproduction, the pictures in each GOP of an MPEG data stream are first decoded in the forward direction, namely, in a time series manner. They are recoded and the reverse order is realized for the first time at a stage of a subsequent redecoding. Thus, "reverse" in reverse reproduction concerns mainly a second decoding. The MPEG bit stream may be realized in a variety of combinations in terms of the order of I, P and B pictures. Frame memories to be included and used in the structure of each embodiment of the present invention may be SDRAM (Synchronous Dynamic RAM), DRAM, Rambus DRAM or the like.

Various component members appear in the following embodiments. In terms of hardware, those embodiments can be realized by a CPU, memory and other LSIs and combined circuit. In terms of software, they are realized by memory-loaded programs or the like with image processing functions. The following description mainly concerns functions that are realized in cooperation with such components. Therefore, it should be understood by those skilled in the art that these functions can be realized in a variety of forms by hardware only, software only or by the combination thereof. An image reproduction apparatus is an example of an "image processing apparatus" according to the present invention.

FIRST EMBODIMENT

This first embodiment exemplifies a structure considered in a case where each block constituting the structure of an image processing apparatus is, for example, made to a single chip. The structure for this embodiment does not particularly take into consideration a correspondence thereof to the present invention, and merely presents examples to be compared and referred to the subsequent embodiments.

Figure 2:
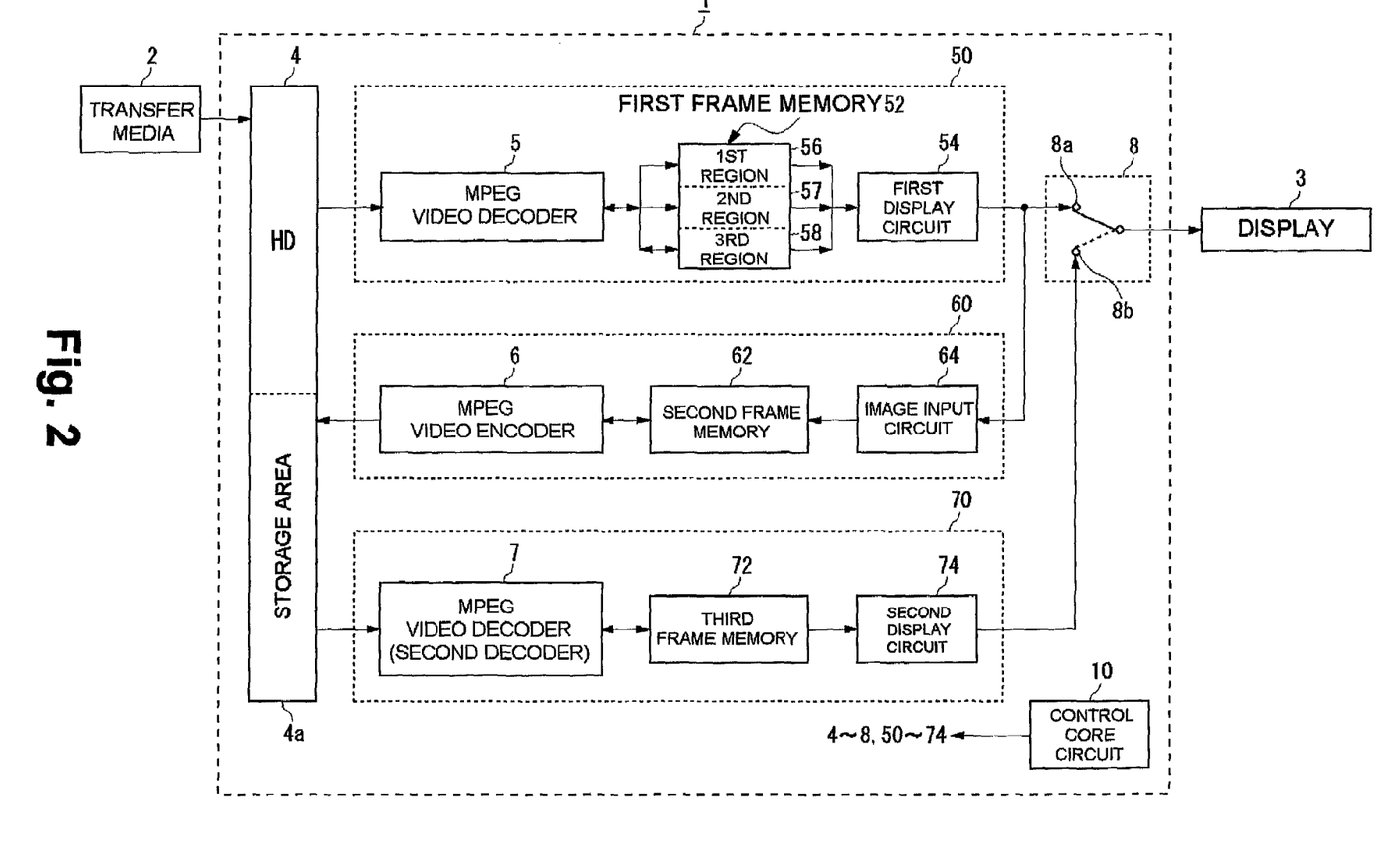
FIG. 2 shows a block circuit diagram of an image reproducing apparatus according to a first embodiment.

FIG. 2 shows a block circuit of an image reproducing apparatus 1 according to a first embodiment. This image reproducing apparatus 1 is incorporated into a movie camera, a still camera, a television, a video CD reproduction apparatus, a DVD reproduction apparatus or the like, which outputs the MPEG video stream from a transfer medium 2 to a display 3. The transfer medium 2 includes storage medium (video CD, CD-ROM, DVD, VTR and so forth), communication medium (LAN and so forth) and broadcasting medium (ground wave broadcasting, satellite broadcasting, CATV and so forth). Moreover, when the data from a storage medium or broadcasting medium are the data which are not coded according to the MPEG video part, the transfer medium also includes an MPEG video encoder which carries out the coding of the digital data. When the image reproducing apparatus 1 is incorporated into a movie camera or a still camera, the transfer medium 2 is replaced by an image pickup device, such as a CCD, and its signal processing circuit.

In FIG. 2, the image reproducing apparatus 1 comprises a hard disk (HD) 4, an MPEG video decoder 5 (hereinafter referred to simply as a "decoder 5" also), an MPEG video encoder 6 (hereinafter referred to simply as an "encoder 6" also), a second MPEG video decoder 7 (hereinafter referred to simply as a "second decoder 7" also), a first frame memory 52, a second frame memory 62, a third frame memory 72, a first display circuit 54, an image input circuit 64, a second display circuit 74, a switching circuit 8 and a control core circuit 10. The control core circuit 10 controls the operation of the decoder 5, the second decoder 7, the encoder 6 and each component of the image reproducing apparatus 1. The hard disk 4, which is comprised of a magnetic disk, stores the video stream transferred from the transfer medium 2 successively. The hard disk 4 is provided with a special storage area 4a within it.

The decoder 5, the first frame memory 52 and the first display circuit 54 constitute a first block 50, while the encoder 6, the second frame memory 62 and the image input circuit 64 constitute a second block 60. The second decoder 7, the third frame memory 72 and the second display circuit 74 constitute a third block 70. The whole or major part of the image reproducing apparatus 1 may be mounted on a single LSI chip, and this may be applied to the other embodiments as well. According to this first embodiment, the first block 50, the second block 60 and the third block 70 are each mounted on a single LSI chip. It is to be appreciated, however, that the first frame memory 52, the second frame memory 62 and the third frame memory 72 may each be mounted externally.

A reproduced image data sequence produced by the decoder 5 is stored temporarily in the first frame memory 52 and then inputted to the first display circuit 54 in regular succession. The first frame memory 52 functions not only as a display buffer but also as a work area for the decoder 5. The first display circuit 54 produces image video signals from picture data transferred from the decoder 5 and outputs the image video signals via the switching circuit 8 to the display 3 which is connected to the image reproducing apparatus 1.

The image video signals outputted from the first block 50 are also inputted to the image input circuit 64. The image input circuit 64 converts the image video signals to a reproduced image data sequence, and the reproduced image data sequence is temporarily stored in the second frame memory 62 and then recoded by the encoder 6 in regular succession. The second frame memory 62 serves also as a work area for the encoder 6.

After a coded data sequence outputted from the second block 60 is stored in a storage area 4a, this is read out in a reverse time series and redecoded by the second decoder 7. A redecoded reproduced image data sequence is temporarily stored in the third frame memory 72 and then converted to image video signals by the second display circuit 74. The third frame memory 72 functions not only as a display buffer but also as a work area for the second decoder 7. These image video signals are outputted via the switching circuit 8 to the display 3 which is connected to the image reproducing apparatus 1.

The switching circuit 8 switches its own connection to a first node 8a side or a second node 8b side according to a control by the control core circuit 10. When the switching circuit 8 is connected to the first node 8a side, forward reproduction based on outputs from the first block 50 is performed. When the switching circuit 8 is connected to the second node 8b side, reverse reproduction based on outputs from the third block 70 is performed.

The first frame memory 52 is divided into a first region 56, a second region 57 and a third region 58. The first region 56 has a capacity for storing at least one I picture or P picture forward-referenced in the decoding of P pictures or B pictures. The second area 57 has a capacity for storing at least one I picture or P picture backward-referenced in the decoding of B pictures. The third area 58 has a capacity for storing at least one B picture. The third region is also used as a work area for a decoding processing by the decoder 5. The second frame memory 62 has a capacity for storing at least one of pictures included in a reproduced image data sequence inputted by the image input circuit 64. The third frame memory 72 has a capacity for storing at least one of pictures included in a reproduced image data sequence decoded by the second decoder 7. These first frame memory 52, second frame memory 62 and third frame memory 72 have a combined capacity for at least five frames.

Figure 3:
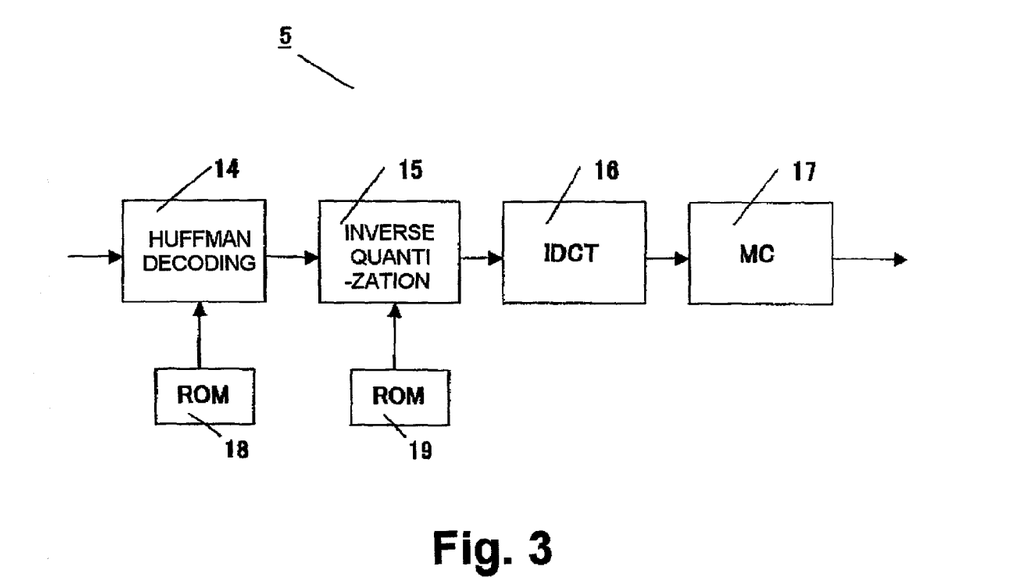
FIG. 3 is a schematic block diagram showing a decoder according to the first embodiment.

FIG. 3 is a block diagram showing a structure of the decoder 5. In FIG. 3, the decoder 5 is comprised of a Huffman decoding circuit 14, an inverse quantization circuit 15, an IDCT (Inverse Discrete Cosine Transform) circuit 16, an MC (Motion Compensated prediction) circuit 17 and ROMs (Read Only Memories) 18 and 19. It is to be noted that the decoder 5 is an example of a "front-end decoder" in the other embodiments of the present invention.

The Huffman decoding circuit 14 carries out variable-length decoding of the pictures read out from the hard disk 4 according to the Huffman code stored in a Huffman table which is stored in the ROM 18. The inverse quantization circuit 15 obtains a DCT (Discrete Cosine Transform) coefficient by performing an inverse quantization, based on a quantization threshold value stored in a quantization table stored in the ROM 19, on results of a decoding by the Huffman decoding circuit 14. The IDCT circuit 16 carries out an IDCT for the DCT coefficient obtained by the inverse quantization circuit 15. The MC circuit 17 performs an MC (Motion Compensated prediction) on results of a processing by the IDCT circuit 16.

In this manner, the decoder 5 generates a reproduced image data sequence continuous in a time series manner by decoding the inputted MPEG video stream. It is to be noted that the MPEG video stream is an example of a "first coded data sequence" in the other embodiments of the present invention.

Figure 4:
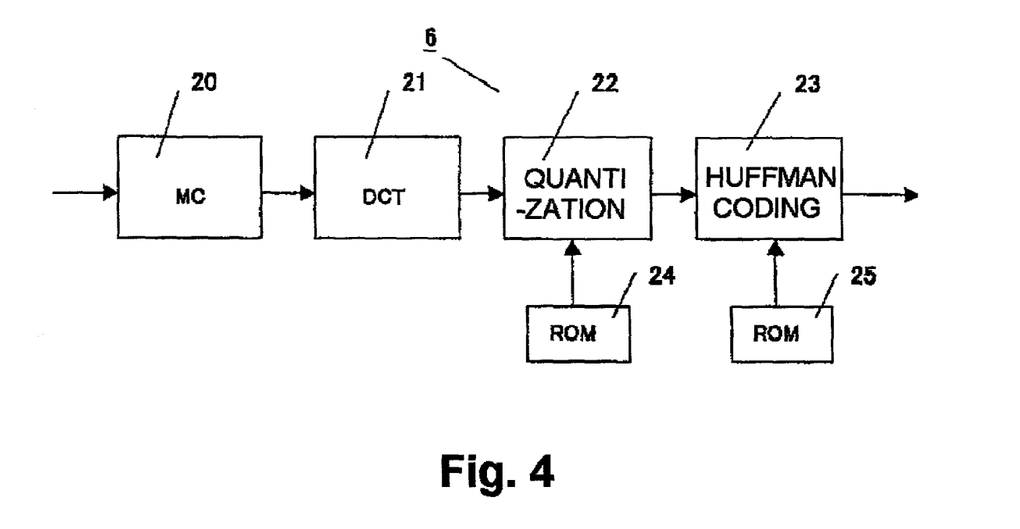
FIG. 4 is a schematic block diagram showing an encoder according to the first embodiment.

FIG. 4 is a block diagram showing a structure of the encoder 6. In FIG. 4, the encoder 6 is comprised of an MC circuit 20, a DCT circuit 21, a quantization circuit 22, a Huffman coding circuit 23 and ROMs 24 and 25. It is to be noted that the encoder 6 is an example of an "encoder" in the other embodiments of the present invention.

The DCT circuit 21 takes in the reproduced image data inputted from the decoder 5 in units of block and generates a DCT coefficient by carrying out a two-dimensional discrete cosine transform. The quantization circuit 22 performs quantization by referring to a quantization threshold value stored in a quantization table stored in the ROM 24. It is to be noted that the ROM 19 may serve also as the ROM 24.

The Huffman coding circuit 23 generates compressed image data in units of picture by performing a variable-length coding on the quantized DCT coefficient by referring to a Huffman code stored in a Huffman table stored in the ROM 25. It is to be noted that the ROM 18 may serve also as the ROM 25.

In this manner, the encoder 6 generates an MPEG video stream by recoding a reproduced image data sequence continuous in a time series. It is to be noted here that this MPEG video stream is one example of a "second coded data sequence" in the other embodiments of the present invention.

Figure 5:
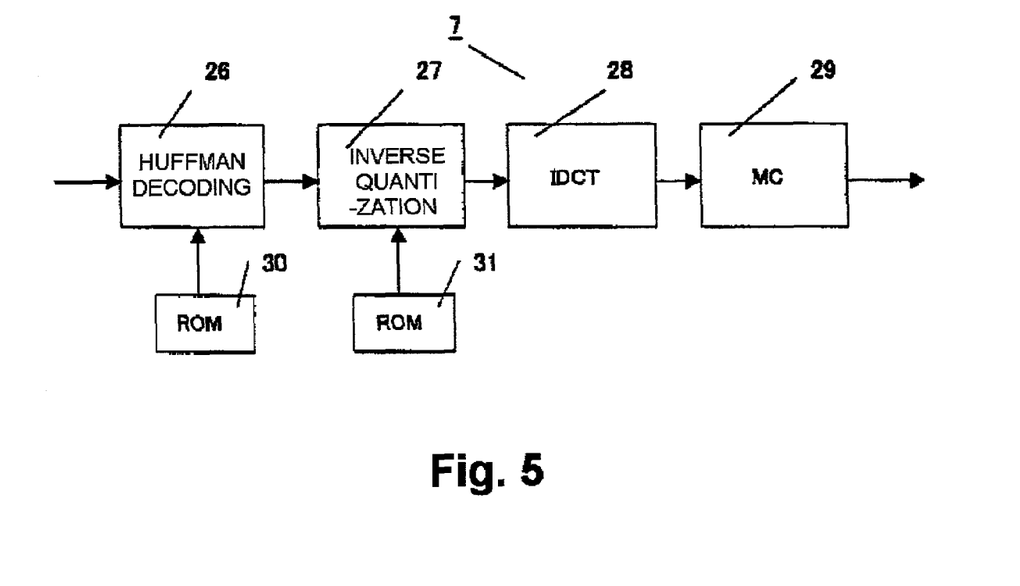
FIG. 5 is a schematic block diagram showing a decoder according to the first embodiment.

FIG. 5 is a block diagram showing a structure of the second decoder 7. In FIG. 5, the second decoder 7 is comprised of a Huffman decoding circuit 26, an inverse quantization circuit 27, an IDCT circuit 28, an MC circuit 29 and ROMs 30 and 31. It is to be noted that the second decoder 7 is one example of a "back-end decoder" in the other embodiments of the present invention.

This second decoder 7 has a structure similar to that of the decoder 5. Thus, the Huffman decoding circuit 26, the inverse quantization circuit 27, the IDCT circuit 28 and the MC circuit 29 have circuit structures similar to those of the Huffman decoding circuit 14, the inverse quantization circuit 15, the IDCT circuit 16 and the MC circuit 17, respectively. It is to be noted also that the ROM 30 may be used also as the ROM 18 or ROM 25, and the ROM 31 as ROM 19 or ROM 24.

Figure 6:
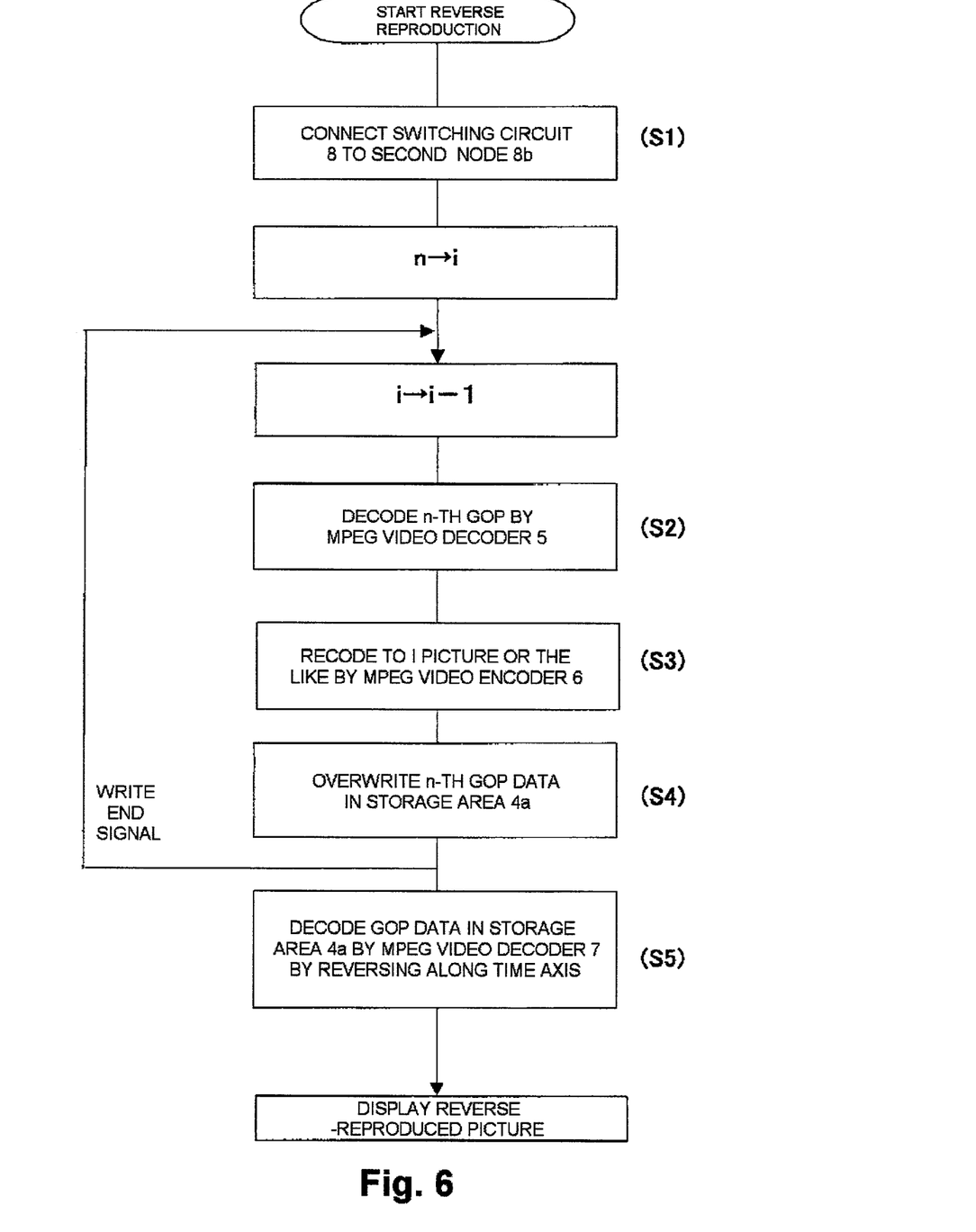
FIG. 6 is a flowchart showing reverse reproduction operation of an image reproducing apparatus according to the first embodiment.

Based on the above-described structures, an operation of reverse reproduction in the image reproducing apparatus 1 according to the present embodiment will be explained, referring to a flowchart shown in FIG. 6. The operation of the image reproducing apparatus 1 is carried out under the control of the control core circuit 10. Here, it is supposed that the MPEG video stream is comprised of i units of GOPs ($GOP_0$ to $GOP_{i-1}$).

In reverse reproduction, each GOP is processed sequentially from $GOP_{i-1}$ by reversing along the time axis. However, the pictures in each GOP are decoded forward, namely, in a time series manner, at the decoder 5. With reverse reproduction instructed, the switching circuit 8 is connected to the second node 8b (S1), an MPEG video stream corresponding to $GOP_{i-1}$ is read out in units of picture from the hard disk 4 and inputted to the decoder 5, and picture by picture of reproduced image data are generated sequentially in a time series and inputted to the encoder 6 (S2). At the encoder 6, the reproduced image data sequence, for one GOP, inputted from the decoder 5 is recoded into I pictures or the like (S3). The recoded data sequence for one GOP from the encoder 6 is overwritten in the storage area 4a of the hard disk 4 (S4).

Upon completion of writing in the storage area 4a, the recoded data sequence stored in this storage area 4a is read out in a reverse time-series manner, namely, by going back along the time axis, and then the second decoder 7 decodes this sequentially and outputs it to the second display circuit 74 (S5). With the end of writing in the storage area 4a, a write end signal is sent out, an MPEG video stream corresponding to a next $GOP_{i-2}$ is inputted to the decoder 5, and the processing from S2 is performed. Namely, in S5, while the data sequence for one GOP is being decoded at the second decoder 7, the data sequence for the next one GOP is being decoded at the decoder 5. To the second display circuit 74, the reproduced image data are inputted in a reverse time-series manner from the second decoder 7, so that the reverse-reproduced pictures are displayed on the display 3.

Figure 7:
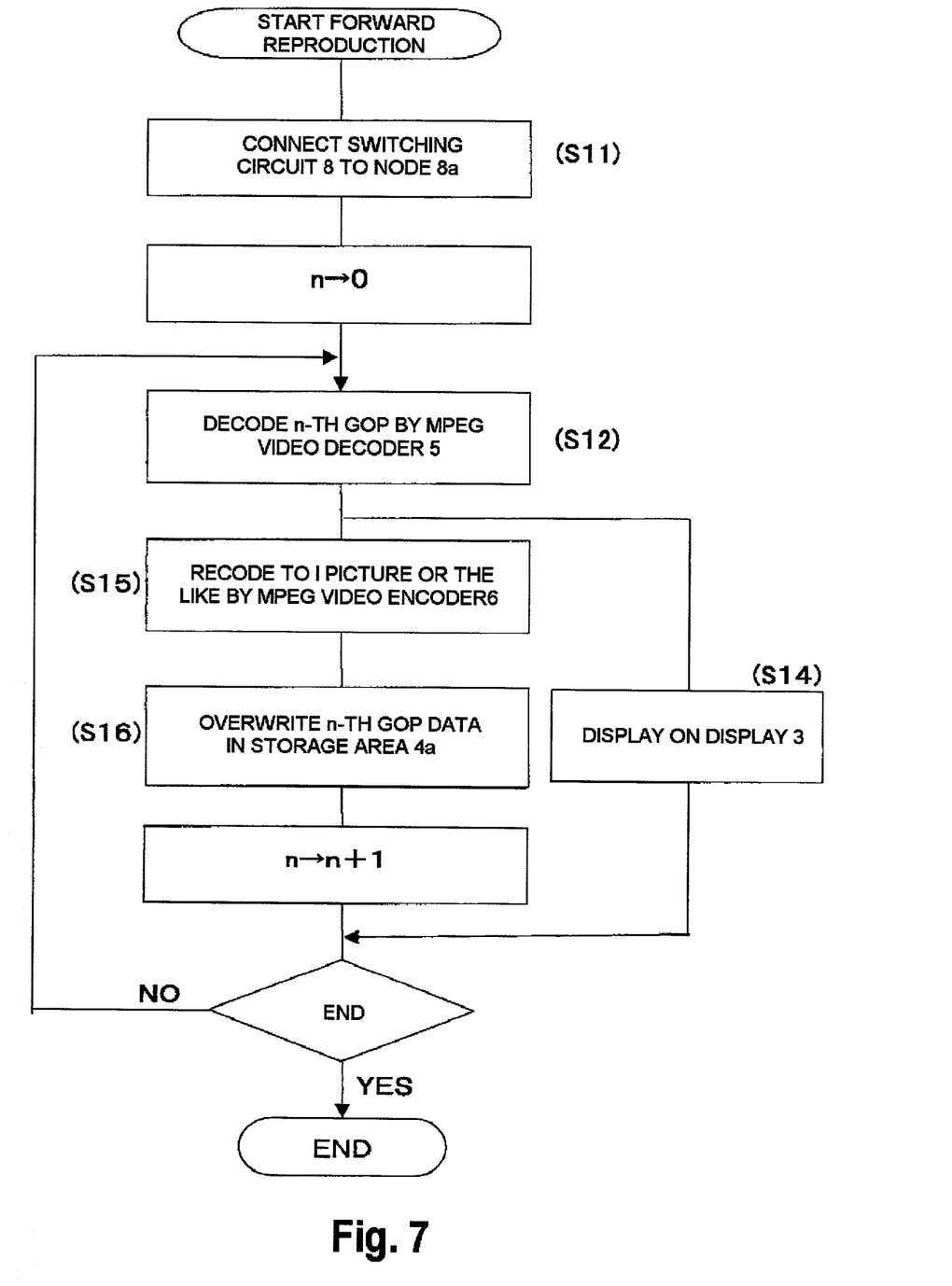
FIG. 7 is a flowchart showing of forward reproduction operation of the image reproducing apparatus according to the first embodiment.

Next, an operation for forward reproduction will be described, referring to a flowchart shown in FIG. 7. In the forward reproduction, data are sequentially processed starting from $GOP_0$ along the time axis. The pictures within each GOP are, of course, decoded in the forward direction at the decoder 5. With forward reproduction instructed, the switching circuit 8 is connected to the first node 8a (S11), an MPEG video stream corresponding to $GOP_0$ is read out picture by picture from the hard disk 4 and inputted to the decoder 5, and the reproduced image data are generated, in units of picture, sequentially in a time series and inputted in parallel to the encoder 6 and the first display circuit 54 (S12). The first display circuit 54 generates video signals based on the inputted reproduced image data in units of picture so as to be outputted to the display 3, thereby the forward reproduced picture is displayed on the display 3 (S14).

On the other hand, the encoder 6, in parallel with a processing of the first display circuit 54, recodes the reproduced image data sequence, for one GOP, inputted from the decoder 5, into I pictures or the like (S15). The recoded data sequence is overwritten in the storage area 4a of the hard disk 4 (S16). Upon completion of the processing of $GOP_0$, the operation returns again to S12 and the processing of the next $GOP_1$ is carried out. In other words, during forward reproduction, the encoder 6, in parallel therewith, recodes the same image data sequence sequentially in units of GOP into I pictures or the like.

SECOND EMBODIMENT

This and subsequent embodiments have structures corresponding to the present invention. The second embodiment represents a more compact design version of the first embodiment. The second embodiment differs from the first embodiment in that the frame memories are so structured as to have a less capacity as a whole. That is, the first frame memory 52 and second frame memory 62 of the first embodiment are combined into one which is structured such that the total capacity thereof is for four frames.

Figure 8:
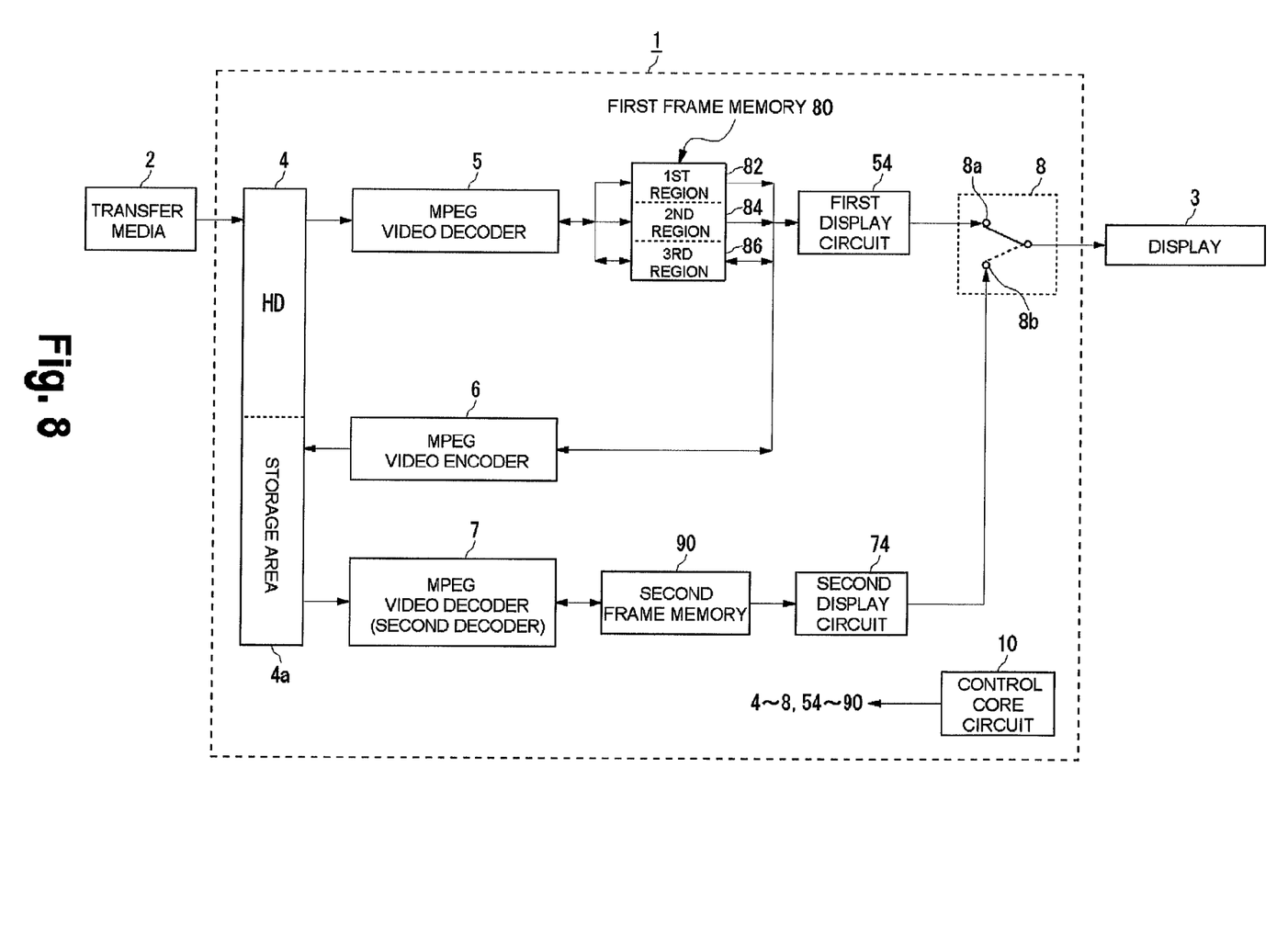
FIG. 8 shows a block circuit diagram of an image reproducing apparatus according to a second embodiment.

FIG. 8 shows a block circuit of an image reproducing apparatus 1 according to a second embodiment. According to the first embodiment, the image video signals read out from the first display circuit 54 are recoded after they are converted to a reproduced image data sequence. In this second embodiment, however, a reproduced image data sequence before conversion into image video signals by the first display circuit 54 is read out and recoded. Hence, this second embodiment does not include a structure corresponding to the second frame memory 62 and image input circuit 64 of the first embodiment. A first frame memory 80 is divided into a first region 82, a second region 84 and a third region 86, which correspond to the first region 56, the second region 57 and the third region 58 of the first embodiment, respectively. However, the third region 86 differs from the third region 58 of the first embodiment in that the third region 86 is also used as a work area for a coding processing by the encoder 6. A second frame memory 90 corresponds to the third frame memory 72 of the first embodiment.

The reproduced image data sequence produced by the decoder 5 during reverse reproduction is not displayed as it is on a display 3. Therefore, it is not actually necessary to input the reproduced image data sequence to the first display circuit 54 but to simply input to the encoder 6. Thus, after the data sequence is transferred from the third region 86 to the encoder 6, the encoder 6 may begin utilizing the third region 86 as the work area without waiting for the data sequence to be converted to image video signals by the first display circuit 54.

A coded data sequence recoded by the encoder 6 is stored in a time series order in the storage area 4a. Then a reverse reproduction is realized by reading this data sequence out in a reverse time-series order and redecoding it by the second decoder 7.

Internal structures of the decoder 5, encoder 6 and second decoder 7 according to this second embodiment may be the same as shown in FIG. 3, FIG. 4 and FIG. 5, respectively. Moreover, the general operation flow may be the same as shown in FIGS. 6 and 7.

As described above, the image reproducing apparatus 1 according to the present embodiment provides the following distinctive operations and advantageous effects:

(1) The frame memory used both as a display buffer and as a work area for coding and decoding can be of a capacity for four frames only. This realizes a memory capacity smaller than the structure of the first embodiment, and lower cost.

(2) Unlike the case with the first embodiment, there is no need for the second frame memory 62 and the image input circuit 64. This realizes smaller size and lower cost.

(3) That the second decoder 7 decodes the coded data sequence read out in a reverse time series realizes reverse reproduction.

THIRD EMBODIMENT

A third embodiment represents a more compact design version of the second embodiment. The third embodiment differs from the second embodiment in that the frame memories are so structured as to have even less capacity as a whole. That is, the first frame memory 80 and second frame memory 90 of the second embodiment are combined into one which is structured such that the total capacity is for three frames only.

Figure 9:
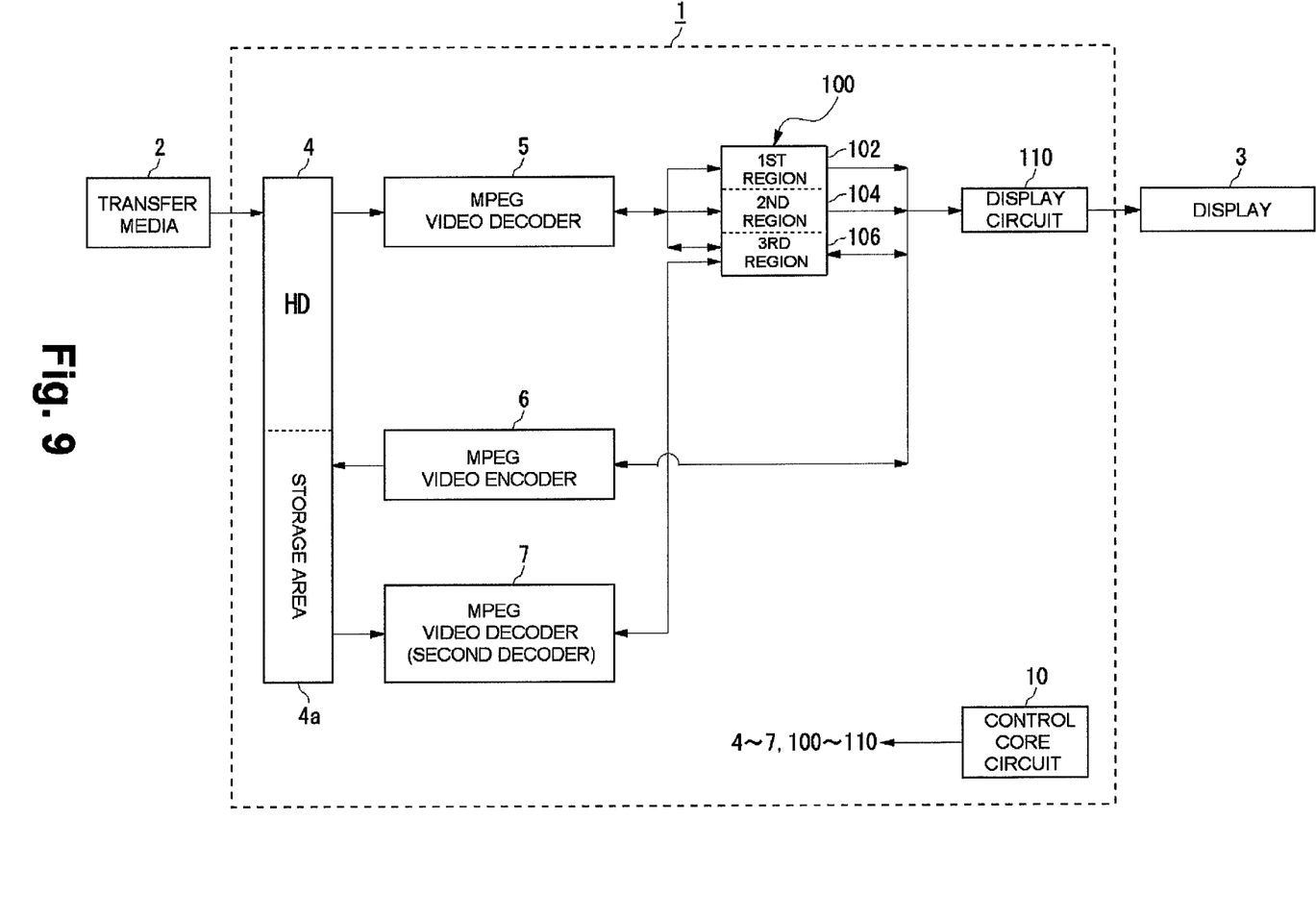
FIG. 9 shows a block circuit diagram of an image reproducing apparatus according to a third embodiment.

FIG. 9 shows a block circuit of an image reproducing apparatus 1 according to the third embodiment. A frame memory 100 is divided into a first region 102, a second region 104 and a third region 106, which correspond to the first region 82, the second region 84 and the third region 86 of the second embodiment, respectively. However, the third region 106 differs from the third region 86 of the second embodiment in that it is also used as a work area for a decoding processing by the second decoder 7. A display circuit 110 corresponds to the first display circuit 54 of the second embodiment. This third embodiment does not include structures corresponding to the second frame memory 90, second display circuit 74 and switching circuit 8 of the second embodiment.

The sharing of the third region 106 is realized by adjusting the timing at which a picture stored in the third region 106 is outputted to the display circuit 110 and the timing at which this picture is overwritten with a picture generated by the decoder 5. For example, the timing may be adjusted such that a line now being displayed on the display 3 is captured and data corresponding to an already displayed line are overwritten. Moreover, this adjustment may be carried out macroblock by macroblock.

On the other hand, the reproduced image data sequence generated by the decoder 5 during reverse reproduction is not displayed as it is on the display 3. Therefore, after the data sequence is transferred from the third region 106 to the encoder 6, the timing may be so adjusted that the overwriting of the data sequence by the reproduced image data sequence generated by the second decoder 7 is started without waiting for it to be converted to image video signals by the display circuit 110.

Internal structures of the decoder 5, encoder 6 and second decoder 7 according to this third embodiment may be the same as shown in FIG. 3, FIG. 4 and FIG. 5, respectively. Moreover, the general operation flow may be the same as shown in FIGS. 6 and 7.

As described above, the image reproducing apparatus 1 according to the present embodiment provides the following distinctive operations and advantageous effects:

(4) The frame memory used both as a display buffer and as a work area for coding and decoding can be of a capacity for three frames only. This realizes a memory capacity even smaller, thus contributing to lower cost.

(5) Unlike the case with the first embodiment, there is no need for the second frame memory 62, image input circuit 64, third frame memory 72, second display circuit 74 and switching circuit 8. This realizes even smaller size and lower cost.

FOURTH EMBODIMENT

A fourth embodiment has a structure as an example of modification from the third embodiment. The fourth embodiment differs from the image reproducing apparatus 1 according to the third embodiment in that reproduced image data sequences directly read out from the decoder 5, instead of reproduced image data sequences read out from the frame memory 100, are coded. Similar to the frame memory 100 of the third embodiment, the frame memory 100 according to the fourth embodiment is structured with a capacity for three frames.

Figure 10:
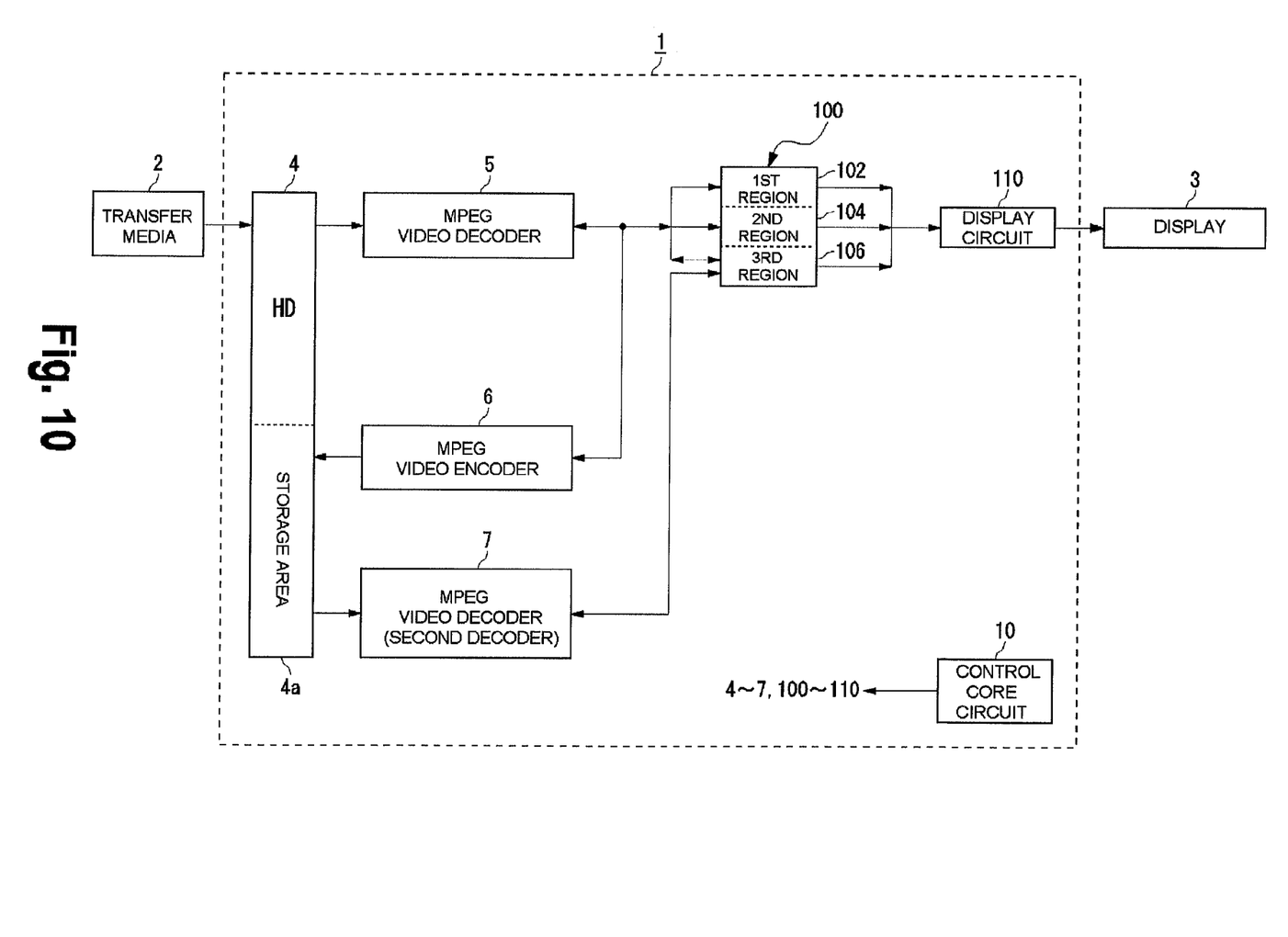
FIG. 10 shows a block circuit diagram of an image reproducing apparatus according to a fourth embodiment.

FIG. 10 shows a block circuit of an image reproducing apparatus 1 according to the fourth embodiment. A reproduced image data sequence outputted from the decoder 5 is inputted not only to the frame memory 100 but also to the encoder 6. A third region 106 is also used as a work area for a coding processing by the encoder 6.

In this fourth embodiment as with the third embodiment, the timing may be so adjusted that the reproduced image data sequence generated by the decoder 5 during reverse reproduction is overwritten with the reproduced image data sequence generated by the second decoder 7 without waiting for it to be converted to image video signals by the display circuit 110. In this case, however, the reproduced image data sequence stored in the third region 106 is not transferred to the encoder 6, so that it is not necessary to adjust the timing.

Internal structures of the decoder 5, encoder 6 and second decoder 7 according to this embodiment may be the same as shown in FIG. 3, FIG. 4 and FIG. 5, respectively. Moreover, the general operation flow may be the same as shown in FIGS. 6 and 7.

As described above, the image reproducing apparatus 1 according to the present embodiment provides the following distinctive operations and advantageous effects:

(6) Similar to the third embodiment, the frame memory used both as a display buffer and as a work area for coding and decoding can be of a capacity for three frames only. This realizes a memory capacity even smaller, thus contributing to lower cost.

(7) Similar to the third embodiment and in contrast to the first embodiment, there is no need for the second frame memory 62, image input circuit 64, third frame memory 72, second display circuit 74 and switching circuit 8. This realizes even smaller size and lower cost.

(8) Coding by the encoder 6 is started without waiting for the reproduced image data sequence generated by the decoder 5 to be written into the frame memory 100. This realizes higher-speed processing as a whole as long as an adequate processing speed is maintained for the coding processing by the encoder 6.

GENERAL EXAMINATION AND VIEW ON THE EMBODIMENTS

As is naturally understood by those skilled in the art, arbitrary combinations of the embodiments, which have not been described herein, are also possible. For example, the following consideration or modifications are possible:

(a) As the hard disk 4, a magneto-optical disk, optical disk or the like is used in place of a magnetic disk.

(b) As the hard disk 4, a rewritable semiconductor memory, such as SDRAM (Synchronous Dynamic RAM), DRAM or Rambus DRAM, is used.

(c) A hard disk 4 and a storage area 4a are provided independently. In this case, the storage area 4a is preferably a rewritable semiconductor memory.

(d) From the MPEG video stream, the data sequence is taken out not in one GOP but in the following units. The following units, including GOP, are included in the concept of units of group.

Units starting from an I picture are not taken as GOP, but the units starting from, for example, a P picture are to be taken as GOP.

Without adhering to the concept of GOP, groups of several pictures are to be units of group.

The number of picture is arbitrarily changed group by group.

(e) RAM (Random Access Memory) is used in place of ROM's 18, 19, 24, 25, 30 and 31.

(f) An operation key to select a reverse production function is provided in the image reproducing apparatus.

(g) Reverse reproduction is carried out frame by frame according to a key operation.

(h) In each of the embodiments described above, pictures included in a recoded data sequence generated by the encoder 6 are written in a time series order into the storage area 4a. However, the data sequence may be written into the storage area 4a while it is rearranged into a reverse time-series order. In this case, the second decoder 7 is not required to read out the recoded data sequence in a reverse time-series manner from the storage area 4a.

(i) In the second, third and fourth embodiments, the decoder 5 and the second decoder 7 may be combined by some hardware means. Moreover, in the second embodiment, the first display circuit 54 and the second display circuit 74 may be combined by some hardware means.

(j) In addition to the above-described embodiments, there are the following modes available as applications in which two coding or decoding functions are provided within a single apparatus. Thus, though in the aforementioned second and fourth embodiments an example was described in which the decoder 5 and the second decoder 7 are put to common use as the shared decoder 53, these encoders may be put to common use in a case where there are two encoders provided.

(i) A case where in a movie camera a subject is shot simultaneously from different angles and the data thereof are compressed and expanded in an MPEG system.

(ii) A case where in television a plurality of programs are decoded simultaneously and two pictures are displayed on a screen.

(iii) A case where in television a plurality of programs are decoded simultaneously and channel switching is made seamlessly. In the broadcast using MPEG, once the decoding is interrupted for channel switching and the like, a little time, or a period of 0.5 to 2 seconds before a new sequence header is detected, is necessary before the decoding is resumed next. Normally, during this period, the picture freezes or suffers a blackout. (iii) is effective in solving this problem.

(iv) In a television connected with a DVD, digital still camera or the like, the broadcast together with the DVD and digital still camera are reproduced simultaneously.

(v) A case in which, during the reproduction of a program, the program or another program on a different channel is recorded in the state of a moving picture or still picture, and at the same time the recorded moving picture or still picture and the program being broadcast are superimposed and reproduced simultaneously.

(vi) A case in which reproduced images are coded in a JPEG system at certain time intervals and taken into a ring buffer, so that these can be used as an index for a jump to a near scene in a reverse search.

(k) For reverse reproduction, it was necessary that the image data for one GOP be stored, just as they are, in the storage area 4a. This is because the data within a GOP are read out only in the forward direction and thus, without all the data for one GOP remaining, the pictures can not be generated in reverse reproduction. For this reason, it is required that the storage area 4a shall have a capacity for recording the image data for one GOP. Such a structure, however, is put to effective use, so that in the first embodiment and others the encoder 6 is made to run free even during forward reproduction so as to constantly generate and maintain the data for reverse reproduction for one GOP. This arrangement is intended to effect smooth switching from forward to reverse reproduction.

Though this method realizes smoother switching of reproduction directions than when there is no free run of the encoder 6, it is not necessarily without a time lag at the switching. This is because when a reverse reproduction is being performed for $GOP_n$, the decoder 5 needs to read out and decode the coded data for one GOP for the preceding $GOP_{n-1}$ and therefore there are possibilities that a series of processings might not be finished before the completion of reverse reproduction of $GOP_n$. Should it not be finished, the reverse reproduction will come to a stop momentarily.

As a countermeasure to this, the time lag at the switching from forward reproduction to reverse reproduction can be eliminated completely by expanding the storage of the image data for one GOP as described in the first embodiment and others and thus by storing the image data for a maximum of about two GOPs. Accordingly, it suffices to take this countermeasure in a case where such specifications are required.

When the number of pixels is to be reduced, decoding in a down conversion format may be carried out beforehand by the IDCT processing at the decoder 7. Namely, while under the normal circumstances the IDCT processing is performed on the square block of, for example, 8×8 pixels, the IDCT may be performed on 8×4 pixels, that are, the ½ size of 8×8 pixels. In that case, since the capacity of the image data to be stored in a frame memory in image reproduction becomes ½, the thus emptied area can be used to store pictures for the above-described two GOPs. With this down conversion performed, however, the images of 1960×1080 pixels in high-definition mode will become those of 980×1080 pixels. Thus, in their reproduction, some resolution restoration processing, such as displaying each pixel twice horizontally, is to be carried out.

(l) The above-described time lag at the switching must be taken into account also for the switching from reverse reproduction to forward reproduction. In this case, too, a similar step, namely, storage of read-in picture data for about one to two GOPs, is taken to be able to cope with this case.

Suppose that the n-th $GOP_n$ is now being read-in processed for reverse reproduction, then the picture data for this $GOP_n$ are held until the read-out for reverse reproduction reaches $GOP_{n-2}$, which is the GOP two GOPs before it. Namely, uninterrupted reproduction, even at the switching to forward reproduction, is realized by holding certain GOP data until the read-out of the data two GOPs before it.

The switching from reverse reproduction to forward reproduction, which can be handled by the processing at the decoder 5 only, has basically a smaller time lag than the case in (k) above. Thus, it seems that in actual applications, data for a little over one GOP, instead of the data for two GOPs as mentioned here, will suffice. However, it is desirable that this value be determined by experiment or the like on each model because it may vary with equipment implementation.

By implementing the present embodiments according to the present invention, a highly efficient image processing technology by which to carry out very smooth reverse reproduction is provided.

Although the present invention has been described by way of exemplary embodiments, it should be understood that many changes and substitutions may be made by those skilled in the art without departing from the scope of the present invention which is defined by the appended claims.

What is claimed is:

1. An image processing apparatus, comprising:
   a front-end decoder which generates a first reproduced image data sequence by decoding a first coded data sequence including I picture, P picture and B picture coded in compliance with MPEG;
   a first frame memory, utilized for a decoding processing by said front-end decoder, which stores the first reproduced image data sequence;
   an encoder which generates a second coded data sequence by recoding the first reproduced image data sequence read out from said first frame memory;
   a back-end decoder which generates a second reproduced image data sequence by decoding the second coded data sequence; and
   a second frame memory, utilized for a decoding processing by said back-end decoder, which stores at least one picture included in the second reproduced image data sequence,
   said first frame memory, including:
   a first region which stores at least one I picture or one P picture to be front referred to for decoding P pictures or B pictures;
   a second region which stores at least one I picture or one P picture to be back referred to for decoding B pictures; and
   a third region, utilized for a decoding processing by said front-end decoder, which stores at least one B picture.

2. An image processing apparatus according to claim 1, wherein processings for the decoding and the recoding are carried out in a predetermined unit of group.

3. An image processing apparatus according to claim 1, wherein said first frame memory and second frame memory include a memory capacity equivalent to at least four frames in total.

4. A television receiver equipped with an image processing apparatus according to claim 1, whereby reproduction of images in a reverse time-series manner is included as part of operational specifications thereof.

* * * * *